United States Patent
Liu

(10) Patent No.: US 10,254,966 B2
(45) Date of Patent: Apr. 9, 2019

(54) DATA MANAGEMENT BASED ON I/O TRAFFIC PROFILING

(71) Applicant: Western Digital Technologies, Inc., Irvine, CA (US)

(72) Inventor: Haining Liu, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 36 days.

(21) Appl. No.: 15/392,512

(22) Filed: Dec. 28, 2016

(65) Prior Publication Data

US 2018/0181302 A1    Jun. 28, 2018

(51) Int. Cl.
  *G06F 12/02* (2006.01)
  *G06F 3/06* (2006.01)
  *G06F 11/14* (2006.01)

(52) U.S. Cl.
  CPC ............ *G06F 3/061* (2013.01); *G06F 3/0659* (2013.01); *G06F 3/0688* (2013.01); *G06F 11/14* (2013.01); *G06F 3/0635* (2013.01); *G06F 3/0653* (2013.01); *G06F 12/0246* (2013.01)

(58) Field of Classification Search
  None
  See application file for complete search history.

(56) References Cited

U.S. PATENT DOCUMENTS

| | | | |
|---|---|---|---|
| 8,566,483 B1 | 10/2013 | Chen et al. | |
| 8,583,838 B1 | 11/2013 | Marshak et al. | |
| 8,713,244 B2 | 4/2014 | Doatmas et al. | |
| 8,782,653 B2 * | 7/2014 | Gibson | G06F 1/3206 718/103 |
| 8,918,583 B2 | 12/2014 | Hoang et al. | |
| 9,442,858 B2 | 9/2016 | Ghodsnia et al. | |
| 2012/0254502 A1 | 10/2012 | Cho | |
| 2015/0248366 A1 | 9/2015 | Bergsten et al. | |

FOREIGN PATENT DOCUMENTS

WO    2014011481 A1    1/2016

OTHER PUBLICATIONS

Storage Intelligence in SSDs and Standards http://www.snia.org/sites/default/files/SDC15_presentations/solid/BillMartin_Storage_Intelligence_SSDs_and_Standards.pdf.
Turbo charging DBMS Buffer Pool Using SSDs http://pages.cs.wisc.edu/~jignesh/publ/turboSSD.pdf.

\* cited by examiner

*Primary Examiner* — Brian R Peugh
(74) *Attorney, Agent, or Firm* — Loza & Loza, LLP; Gabriel Fitch

(57) ABSTRACT

Data storage devices and systems include a non-volatile memory array including a plurality of non-volatile memory cells, a host interface for communicating with a host system, and a controller configured to receive data storage access commands from the host system over the host interface, determine an input/output (I/O) state of the data storage device based at least in part on the received data storage access commands, and execute a data management operation based at least in part on the I/O state of the data storage device.

26 Claims, 5 Drawing Sheets

HOST I/O STATE TRANSITIONS

DATA MANAGEMENT BASED ON I/O TRAFFIC PROFILING

BACKGROUND

Field

This disclosure relates to data storage systems. More particularly, the disclosure relates to systems and methods for managing input/output (I/O) traffic in a data storage device.

Description of Related Art

In data storage devices and systems, host and/or internal I/O activity can have a bearing on performance and/or other aspects of storage device operation.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
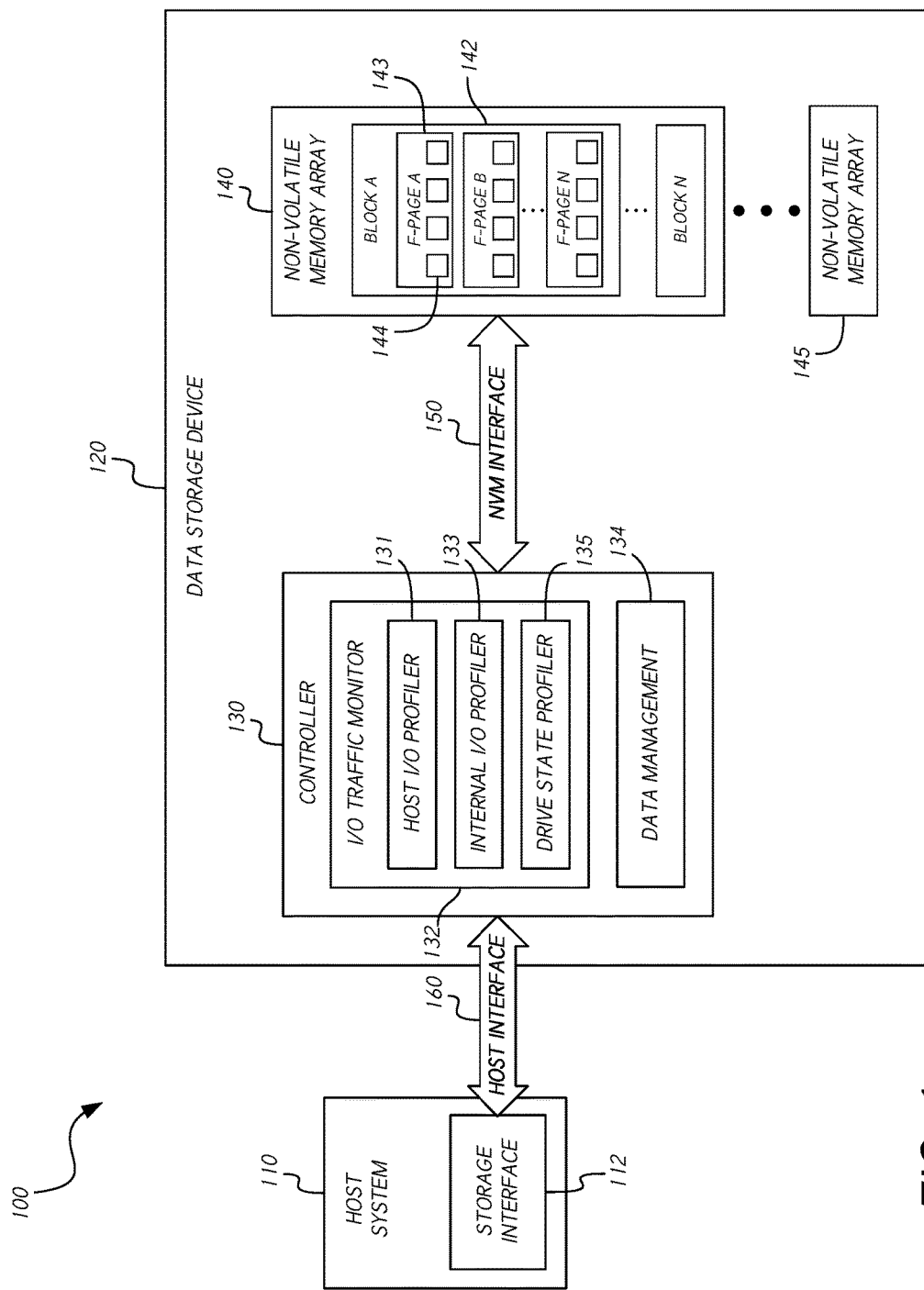
FIG. 1 is a block diagram of a data storage system according to one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to backing up data in a computing system.

Overview

In data storage systems, such as solid-state memory systems, changes in a host input/output (I/O) traffic profile can present difficulties with respect to providing sufficiently prompt response to the host. The controller, or control circuitry, for the data storage device coupled to the host may generally provide optimal performance for a particular I/O profile only after a ramp-up period, during which the storage device may transition to a steady state for servicing the changed profile. Generally, transitions in I/O profiles from a heavy random write profile to a heavy read (e.g., all-read) profile may be particularly difficult for a data storage device to handle promptly.

In addition to issues related to host response times and quality of service, certain other aspects of data management in a data storage device or system may be affected by, or related to, the operational I/O state of the data storage device/system. For example, the implementation of spatial locality for written data, which may refer to the relative physical locations of data written to the data storage media at a particular time, can be improved by knowledge of the host and/or internal I/O traffic profile(s) associated with the data storage device/system. The relative load of host I/O traffic versus internal data maintenance operations, or whether the internal data maintenance operations are relatively heavy or light, can advantageously be assessed to improve spatial locality control. Furthermore, scheduling and/or implementation of certain data maintenance operations, such as garbage collection, wear leveling, and other background internal activity may be improved in view of host and/or internal I/O profile information.

Certain embodiments disclosed herein provide for improved performance and/or efficiency in data storage systems and devices through the implementation of intelligent background activity scheduling based on determined run-time drive operational I/O states. A data storage device in accordance with the present disclosure may utilize traffic profiler component(s)/circuitry to leverage determined I/O statistics (e.g., periodically updated or collected I/O statistics) relating to one or more of the host data path and the internal data path of the data storage device. For example, determined/collected I/O statistics may indicate the number of read operations per second and/or write operations per second in certain implementations. The I/O statistics may be used to recursively update I/O state characterizations for the data storage device. For example, I/O state characterizations may be set using a relatively light-weight decision logic implemented by the control circuitry of the device, or other device or module.

In some implementations, I/O states that are determined based on host and/or internal I/O statistics may include a determined host I/O state, internal I/O state, and/or overall drive I/O state for the data storage device. Examples of different host I/O states may include any or all of the following: an idle state, a read-only state, a no-write state, a write-only state, and a mixed read and write state. Examples of different internal I/O states may include any or all of the following: a no internal I/O state, a light internal I/O state, a moderate internal I/O state, and a heavy internal I/O state. Possible drive I/O states may include a steady state and a transient state, among possibly others. In certain embodiments, the determined I/O states can be used to direct various data management operations, such as garbage collection, background scanning, mixing/separation of host and internal data, wear leveling operations, etc. Some implementations incorporate configurable I/O profile sensitivity.

Implementation of intelligent data management according to host and/or internal I/O statistics may provide desirable transition times from heavy random write I/O profiles to peak random read profiles, such as below 10 seconds, for example. Furthermore, intelligent spatial-locality control according to the present disclosure may provide an improvement in random mix traffic (e.g., 15-20% improvement compared to certain other systems/device). Intelligent data management according to the present disclosure may further provide relatively tighter quality of service performance, the ability to implement variable-intensity background scanning, and/or improved hot/cold block wear leveling.

Although certain embodiments are disclosed herein in the context of solid-state data storage devices and systems, it should be understood that certain features disclosed herein may be applicable devices/systems incorporating one or more other types of data storage, such as magnetic media, or other volatile or non-volatile memory. As used in this application, "non-volatile solid-state memory," "non-volatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Data Storage System

FIG. 1 is a block diagram illustrating an embodiment of a combination of a host system 110 with a data storage device 120 incorporating input/output (I/O) traffic profiling and/or data management functionality in accordance with embodiments disclosed herein. The data storage device 120 may be any type of data storage device, module, component, system, or the like. Furthermore, the terms "drive" and "data storage drive" may be used herein in certain contexts to refer to any type of data storage device, and may be used substantially interchangeably with the term "data storage device" herein in connection with certain embodiments and/or in certain contexts. As shown, the data storage device 120 (e.g., hybrid hard drive, solid-state drive, any storage device utilizing solid-state memory, etc.) includes a controller 130 (e.g., control circuitry) configured to receive data commands to execute such commands in the non-volatile memory array 140. Such commands may include data read/write commands, and the like. The controller 130 may comprise one or more processors, memory devices, data and/or power transmission channels/paths, boards, or the like. In certain embodiments, the controller 130 may be implemented as one or more system-on-a-chip (SoC) modules, field-programmable gate array (FPGA) modules, chips, or the like. In certain embodiments, one or more components of the controller 130 may be mounted on a printed circuit board (PCB). The controller 130 may be configured to receive data commands from a storage interface (e.g., a device driver) 112 residing on the host system 110. The controller 130 may communicate with the host system 110 over a host interface 160, and may receive data storage access commands using the host interface 160. Data storage access commands may specify a block address in the data storage device 120; data may be accessed/transferred based on such commands.

The data storage device 120 can store data received from the host system 110 such that the data storage device 120 acts as data storage for the host system 110. To facilitate this function, the controller 130 can implement a logical interface. The logical interface can present to the host system memory as a set of logical addresses (e.g., sequential/contiguous addresses) where data can be stored. Internally, the controller 130 can map logical addresses to various physical memory addresses in the non-volatile solid-state memory array 140 and/or other memory module(s) (e.g., non-volatile memory array 145). Mapping data indicating the mapping of logical addresses to physical memory addresses may be maintained in the data storage device. For example, mapping table data may be stored in non-volatile memory array 140 in order to allow for recreation of mapping tables following a power cycle.

In certain embodiments, the non-volatile memory array 140 comprises one or more blocks of storage, identified as Block "A" 142 through Block "N." Each block may comprise a plurality of flash pages (F-pages). For example, Block A 142 of FIG. 1 includes a plurality of F-pages, identified as F-pages A 133, B, through N. In some embodiments, each F-page is a smallest grouping of memory cells in the non-volatile memory array 140 that can be programmed in a single operation or as a unit. Further, each F-page may include a plurality of code words, such as error-correcting pages (E-pages). In the illustrated embodiment, each F-page includes four E-pages that are illustrated as four boxes, including E-page 144. Other embodiments may use F-pages or E-pages that are defined differently or each F-page may include greater or fewer than four E-pages.

The controller 130 includes an I/O traffic monitor module 132 configured to manage, and respond to, I/O traffic profile changes in the data storage device 120. For example, the I/O traffic monitor may be configured to determine various I/O traffic states associated with the data storage device 120 according to host I/O profiler 131, internal I/O profiler 133, and/or drive state profiler functionality thereof.

When the data storage device 120 is operating in a write mode, the storage space of the non-volatile memory array 140 may be modified. In connection with certain write operations or profiles (e.g., random write profile), the data storage device may suffer from write amplification, wherein an amount of data is written in response to a host write operation that is greater than the actual amount of host data provided by the host to be written. For example, the excess amount of data written for a write operation may include data associated with one or more data maintenance/management operations, which may be required to provide sufficient free storage space to accommodate the host payload. Write amplification may therefore introduce additional internal writes into the write channel for the non-volatile memory array. Write amplification may be particularly prevalent with respect to random host writes.

Certain solid-state storage devices can struggle to respond to changes in a host I/O profile in a prompt or desirable fashion. For example, when the non-volatile memory (NVM) interface 150 is occupied with write operations (e.g., random write), host read operations can be effectively blocked, or slowed, for an undesirable amount of time where the controller 130 is not configured to characterize the relevant I/O profiles of the data storage device 120 and modify utilization of the NVM interface 150 based thereon. For example, when the host 110 switches suddenly to an all-read profile while an internal write is being performed by the controller 130, the read performance may suffer for a period of time due to a bottleneck in the NVM interface 150. Therefore, the full bandwidth of the NVM interface 150 may not be available for the read profile immediately, resulting possibly in reduced performance.

In certain embodiments, the I/O traffic monitor 132 may be configured to detect changes in the host I/O pattern, such as a switch from a random write profile to a heavy read profile, and respond to such changes by, for example, switching off internal writes and substantially immediately opening the bandwidth of the NVM interface 150 to the host read operations. The controller 130 may respond to the change in the host I/O profile by completing the currently-executed write operation(s) and discontinuing the scheduling of additional write operations; pending internal write operations may be cancelled in certain embodiments.

In certain embodiments, the I/O traffic monitor 132 is configured to detect traffic profile transitions sufficiently quickly to provide improvement in ramp-up time with respect to servicing read requests for certain I/O profiles. Such traffic profile transition detection functionality may be leveraged to enhance operation of the data storage device with respect to performance, efficiency, and/or data storage maintenance. For example, the controller 130 may utilize the I/O traffic monitor 132 to improve the quality of service of the data storage device with respect to latency, throughput, variation of certain I/O profile throughput, and/or the like. In order to improve quality of service control, the I/O traffic monitor 132 may be configured to differentiate between I/O attributable to host read commands, internal read operations, host write operations, internal write operations, and/or NVM erase operations, which may be controlled at least in part by firmware execution in the controller 130. The scheduling of such I/O operations may be scheduled intelligently in order to render desirable service metrics for the host system 110. The I/O profile information provided by the host I/O profiler 131, internal I/O profiler 133, and/or drive state profiler 135 may be used to intelligently control spatial locality of write operations executed in the non-volatile memory array 140. For example, the data management module 134 may implement spatial locality according to I/O profile information provided by the I/O traffic monitor 132.

As used herein, "traffic profile," "I/O profile," "I/O traffic profile," and the like may be used to represent information indicating a volume and/or relative makeup of types of I/O operations in a data storage access workload. For example, an I/O traffic profile may indicate what proportion, or percentage, of a workload is attributable to write operations vis-à-vis read operations (e.g., 100% write, 70% write and 30% read, etc.). In certain embodiments, the data management 134 may be configured to schedule internal background activity intelligently according to I/O profile information provided by the I/O traffic monitor 132.

Data Management Based on I/O Profiles

Figure 2:
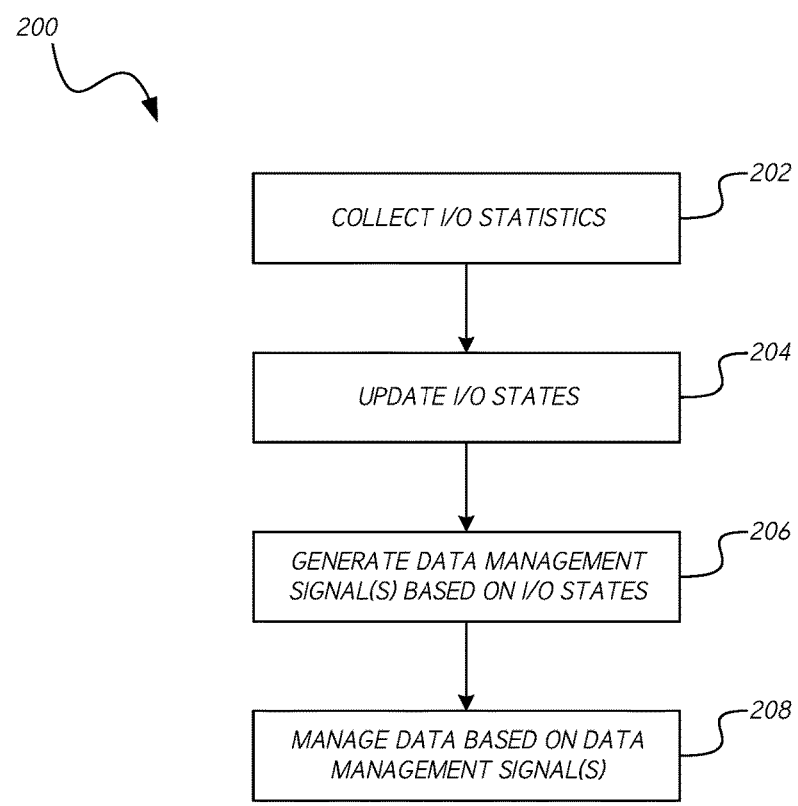
FIG. 2 is a flow diagram illustrating a process for managing data in a data storage system and/or device using input/output (I/O) profile information according to one or more embodiments.

Certain embodiments disclosed herein provide devices, systems, and methods for controlling data management activity/operations based at least in part on determined I/O profile information. FIG. 2 is a flow diagram illustrating a process 200 for managing data in a data storage system and/or device using input/output (I/O) profile information, such as I/O state characterization information.

The process 200 may provide, at least in part, a mechanism for reducing the ramp-up time of a data storage device with respect to peak read performance when a communicatively coupled host system switches from, for example, a heavy random write I/O profile to an all-read profile relatively abruptly. The process 200 may be performed at least in part by a controller or control circuitry associated with the data storage device, such as by the controller 130 shown in FIG. 1 and described above. For example, the controller 130 may implement the process 200 through the execution of firmware or other functional code of the data storage device 120, in combination with certain hardware components, including one or more processors, transmission lines, data storage devices, and/or the like. In certain embodiments, the process 200 may provide for the profiling of I/O traffic associated with the data storage device, and the using of such profile information to more quickly respond to changes in the I/O traffic profile(s). The process 200 may be implemented, at least in part, by or in connection with an I/O profiler module or device, which may be implemented by a controller or control circuitry associated with the data storage device.

At block 202, the process 200 involves collecting or otherwise obtaining I/O statistics associated with a data storage device. For example, the I/O statistics may relate to a host I/O profile and/or an internal drive I/O profile. In certain embodiments, an I/O profiler associated with the data storage device may be configured to provide information characterizing run-time dynamics of one or more of the host I/O profile and the internal data I/O profile. The data path I/O statistics and/or the internal I/O (i.e., data movement) statistics may be leveraged in a recursive fashion in order to make intelligent decisions/predictions with respect to the I/O traffic profile. In certain embodiments, the process 200 involves taking a comprehensive assessment of the I/O traffic environment on the data storage device, and controlling one or more functionalities (e.g., firmware operations) based thereon.

At block 204, the process 200 involves updating I/O state(s) of the data storage device based at least in part on the collected or otherwise obtained I/O statistics. For example, the updated states may be related to states of a host I/O profiler, which may be based on host I/O statistics, states of an internal I/O profiler, which may be based on internal I/O statistics, and/or states of a drive state profiler, which may be based on one or more of host I/O statistics and internal I/O statistics. Determination of run-time operational I/O states of the data storage device may be desirable for directing the scheduling of background scanning activity, or other internal data management activity.

At block 206, the process 200 involves generating one or more data management signals based at least in part on the updated I/O states. For example, the data management signals may be related to one or more of spatial-locality control, background operations, garbage collection operations, wear leveling operations, or the like. In certain embodiments, data management signals based on the updated I/O states may help to reduce the transition time when the host I/O traffic switches from one profile to another, such as from an all-write profile to all-read profile, thereby improving the host-perceived read performance of the data storage device.

With regard to spatial locality, providing the data management signal(s) based on the updated I/O states may involve providing intelligent determinations regarding the locality of the data being written. In certain embodiments, the locality of the host data is adjusted in run-time. For example, when the amount of host data committed to the data storage device is approximately equal to the amount of internal data being moved at a given time, spatial locality control according to the present disclosure may involve separating the host data write stream from the internal data write stream in terms of locality, which may be relatively safe where both streams modify the drive at roughly the same speed. Alternatively, when the amount of internal data writes being performed is substantially greater than the amount of host data writes being performed, the separation of locality may not be as safe due to the potential polarization of the blocks of the data storage media in terms of erase counts, and therefore the spatial locality control functionality may not separate the host data write stream from the internal data write stream in terms of locality. In addition to spatial locality control, the garbage collection and/or wear leveling strategies of the data storage device may be determined based on the I/O states.

Figure 3:
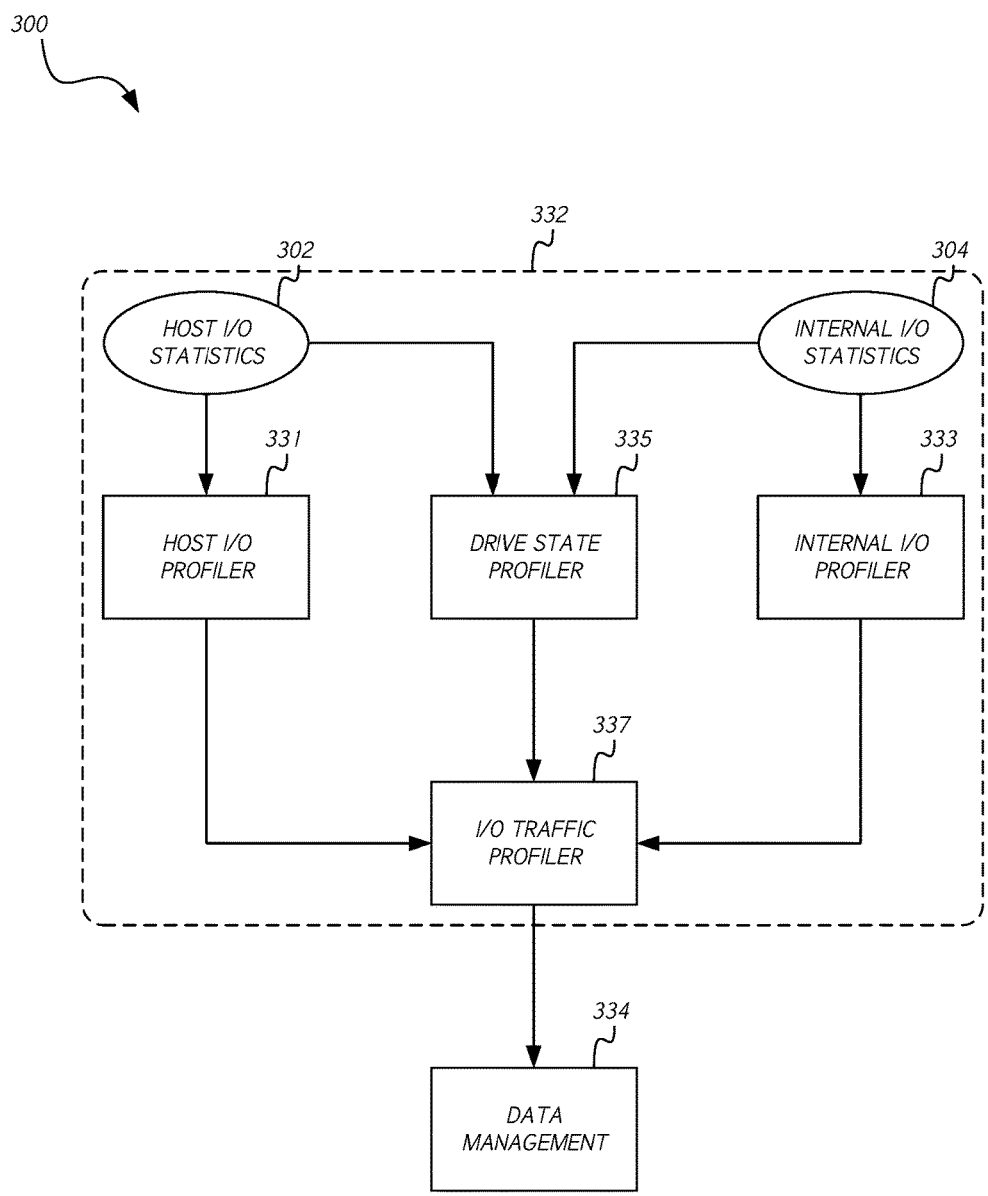
FIG. 3 is a diagram of a data management system according to one or more embodiments.

FIG. 3 is a diagram of a data management system 300 according to one or more embodiments. The data management system 300 may be implemented at least in part by a controller or control circuitry of a data storage device or system, such as the data storage device 120 of FIG. 1. The data management system 300 includes an I/O traffic monitor 332, which may utilize one or more of host I/O statistics 302 and internal I/O statistics 304 for the purpose of classifying one or more I/O states associated with the data storage drive. The host I/O statistics and internal I/O statistics may be periodically-collected by the data management system 300, or may be received from a separate module or device. The I/O statistics may include information indicating, for example, a number of host or internal read operations per second, and/or a number of host or internal write operations per second. In certain embodiments, the host and/or internal I/O statistics may be collected according to a storage device operational process for various purposes. The I/O traffic monitor 332 may leverage such statistics by generating or otherwise obtaining periodic example statistics that provide a snapshot of the host and/or internal I/O profile(s). In certain embodiments, the host I/O statistics 302 and/or internal I/O statistics 304 may be reset after a period of time and recounted/collected. The periodically-sampled I/O statistics may be sampled, for example, according to a 1-second or ½-second sampling rate, or other sampling rate.

The I/O traffic monitor 332 may comprise a plurality of state machines, including a host I/O profiler 331, an internal I/O profiler 333, and/or a drive state profiler 335. Each of the state machines may determine a respective I/O state and provide such state information to an I/O traffic profiler 337. In certain embodiments, the I/O traffic profiler 337 is configured to generate one or more data management control signals based on the I/O states.

The host I/O profiler 331, drive state profiler 335, and internal I/O profiler 333 may be configured to set select/set respective I/O states from among respective sets of states having any suitable or desirable number and/or characterization of states. In certain embodiments, the host I/O profiler 331 may determine a current host I/O profile state from among the set comprising or consisting of the following states: an idle state, a read-only state, a no-write state, a write-only state, and/or a mixed read and write state. In certain embodiments, the internal I/O profiler 333 may determine a current internal I/O profile state from among the set comprising or consisting of the following states: a no internal I/O state, a light internal I/O state, a moderate internal I/O state, and/or a heavy internal I/O state. In certain embodiments, the drive state profiler 335 may determine a current drive state from among the set comprising or consisting of the following states: a steady state and a transient state. The drive state profiler 335 may collect host-side write path statistics, and/or internal write path statistics and determine the current drive state based on such input information.

The I/O traffic profiler 337 may provide data management control signals based on the various I/O states to a data management module 334 configured to execute one or more data management operations in the data storage device, such as read/write operations according to a spatial locality strategy, garbage collection, wear leveling, background scanning, and/or other internal data management functionality.

Figure 4:
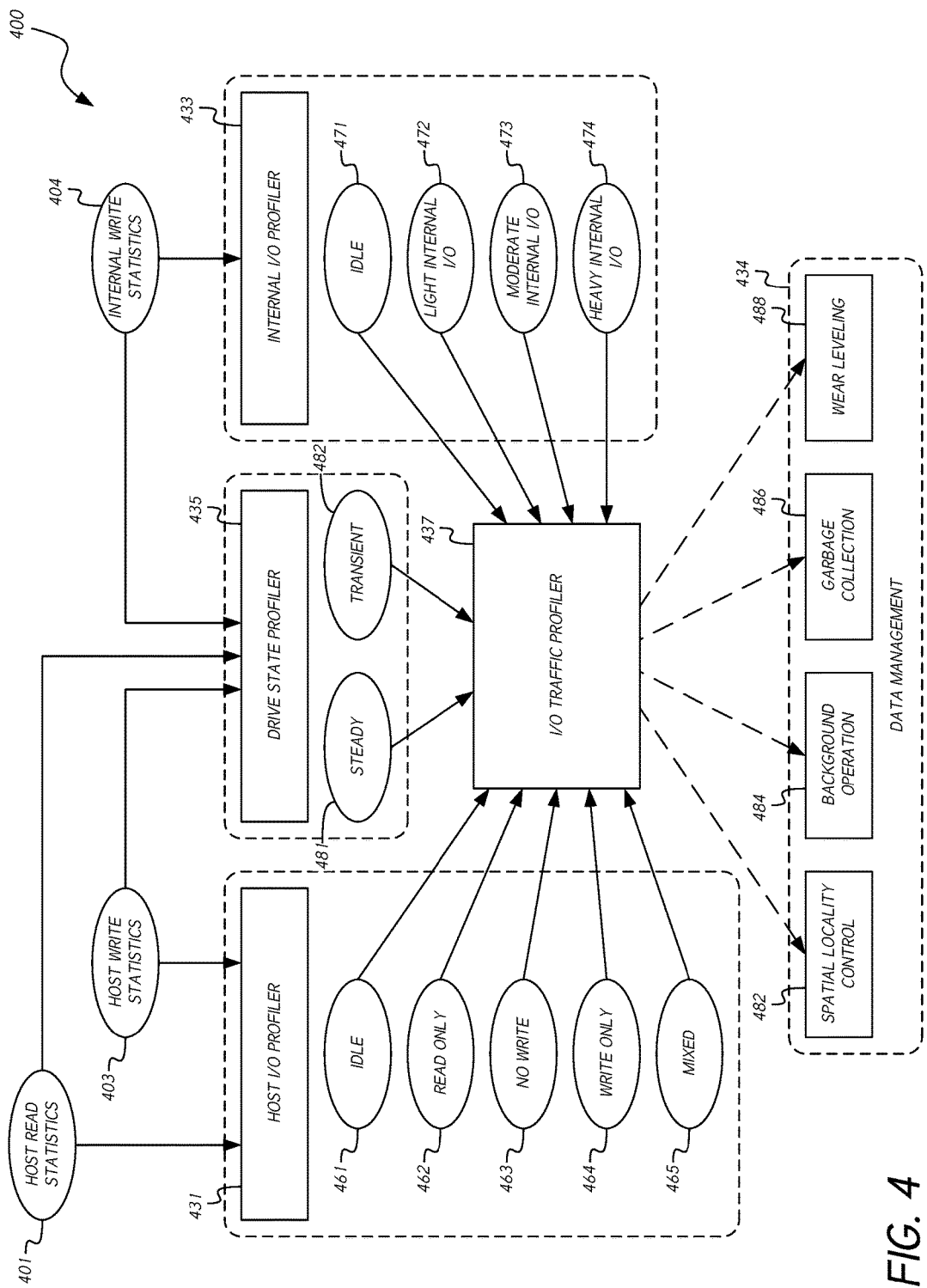
FIG. 4 is a diagram of a data management system according to one or more embodiments.

FIG. 4 is a diagram of a data management system 400 according to one or more embodiments. The data management system 400 may be implemented at least in part by a controller or control circuitry of a data storage device or system, such as the data storage device 120 of FIG. 1. The data management system 400 includes an I/O traffic profiler 437 configured to control one or more data management operations according to I/O traffic profile states. The I/O traffic profiler 437 may utilize I/O state information from a host I/O profiler 431, internal I/O profiler 433, and/or a drive state profiler 435. The I/O traffic profiler 437, host I/O profiler 431, internal I/O profiler 433, drive state profiler 435, as well as the various data management modules 434 (e.g., spatial locality control module 482, background operation module 484, garbage collection module 486, wear leveling module 488) may each provide means for implementing certain respective functionalities as described herein, wherein such means may comprise control circuitry (e.g., special purpose control circuitry) including one or more processors (e.g., special purpose processor(s)), memory devices, transmission paths, and other hardware and/or software components or combinations thereof, configured to implement the functionalities of the respective modules described herein.

The host I/O profiler 431, internal I/O profiler 433, and/or a drive state profiler 435 may each utilize I/O one or more of host read statistics 401, host write statistics 403, and internal write statistics 404. The host I/O statistics and internal I/O statistics may be periodically-collected by the data management system 400, or may be received from a separate module or device. The I/O statistics may include information indicating, for example, a number of host or internal read operations per second, and/or a number of host or internal write operations per second. In certain embodiments, the host and/or internal I/O statistics may be collected according to a storage device operational process for various purposes. The data management system 400 may leverage such statistics by generating or otherwise periodically obtaining statistics that provide a snapshot of the host and/or internal I/O profile(s). In certain embodiments, the host I/O statistics 401, 403 and/or internal I/O statistics 404 may be reset after a period of time and recounted/collected. In certain embodiments, only the sample values during the relevant time period are required, and no historical values are maintained. Alternatively, historical I/O statistic information may be maintained in the data storage device.

The host I/O profiler 431, the internal I/O profiler 433, and the drive state profiler 435 may each comprise a state machine configured to set a respective I/O state and provide such state information to the I/O traffic profiler 437. In certain embodiments, the I/O traffic profiler 437 is configured to generate one or more data management control signals based on the I/O states and provide such signals to data management components 434 for control of various data management operations/functionality, such as spatial locality control 482, background operations 484, garbage collection 486, and/or wear leveling 488.

The host I/O profiler 431, drive state profiler 435, and internal I/O profiler 433 may be configured to set select/set respective I/O states from among respective sets of states having any suitable or desirable number and/or characterization of states. In certain embodiments, the host I/O profiler 431 makes host I/O state determinations based on the host read statistics 401 and the host write statistics 403. In the illustrated embodiment, the host I/O profiler 431 may determine a current host I/O profile state from among the illustrated set comprising or consisting of the following states: an idle state 461, a read-only state 462, a no-write state 463, a write-only state 464, and/or a mixed read and write state 465. In certain embodiments, the set of states used by the host I/O profiler 431 does not include the no-write state 463. The host I/O profiler 431 may provide the selected/set host I/O state information to the I/O traffic profiler 437.

In the illustrated example of FIG. 4, the internal I/O state machine 433 parses the estimated internal traffic profiles into four different states. In certain embodiments, the internal I/O profiler 433 makes internal I/O state determinations based on the internal write statistics 404. In certain embodiments, the internal I/O profiler 433 may determine a current internal I/O profile state from among the illustrated set comprising or consisting of the following states: an idle state 471, which may represent an I/O profile with no internal I/O, a light internal I/O state 472, a moderate internal I/O state 473, and/or a heavy internal I/O state 474. The internal I/O profiler may provide the selected/set internal I/O state information to the I/O traffic profiler 437.

In certain embodiments, the drive state profiler 435 makes drive state determinations based on the host write statistics 403 and the internal write statistics 404. In certain embodiments, the drive state profiler 435 may determine a current drive state from among the illustrated set comprising or consisting of the following states: a steady state 481 and a transient state 482. The drive state profiler 435 may collect host-side read path statistics, and/or internal host-side write path statistics and determine the current drive state based on such input information. The drive state profiler 435 may provide the selected/set drive state information to the I/O traffic profiler 437.

The various I/O profile states determined by the host I/O profiler 431, the internal I/O profiler 433 and the drive state profiler 435 may be considered estimated I/O states. Such states may be leveraged to signal and/or instruct various data management functional modules 434, which may be used for drive operation. The I/O traffic profiler 437 may provide data management control signals based on the various I/O states to one or more data management functional modules 434 configured to execute one or more data management operations in the data storage device, such as a spatial locality control module 482, a garbage collection module 486, a wear leveling module 488, and/or a background operation module, which may implement background scanning and/or other internal data management functionality.

Based at least in part on the outputs of one or more of the profiler modules (431, 433, 435), the I/O profiler may generate one or more of the following output signals and provide the same to the data management module(s) 434: a signal instructing the garbage collection module 486 to halt or reduce garbage collection, a signal instructing the background operation module 484 to initiate background scanning (e.g., immediately), a signal instructing the spatial locality control module 482 to mix host I/O and internal I/O in the write interface, and a signal instructing the wear leveling module 488 to switch to a different wear leveling strategy. The data management components 434 may be implemented to shut down or cease certain internal data movement operations in response to I/O state information in order to provide additional resources for host servicing. With respect to spatial-locality control, the I/O traffic profiler 437 may direct the spatial locality control module 482 to spread the host data across data storage chips or arrays in order to facilitate parallelism when servicing host access to the data.

The internal I/O paths of the data storage device may be utilized by the garbage collection module 486 for read and write operations to achieve consolidation of valid data stored in at least partially-invalid blocks, for example. Wear leveling is another operation involving utilization of internal I/O paths. For wear leveling, data may be moved from one block, device, chip or array to another to avoid data loss when the quality of certain memory addresses deteriorates. Wear leveling control by the I/O traffic profiler may be based on input from each of the host I/O profiler 431, the internal I/O profiler 433, and the drive state profiler 435 in certain embodiments. Control of the wear leveling module 488 may involve controlling the wear leveling intensity as to not substantially or undesirably interfere with host I/O processes.

The background operation module 484 may be configured to perform various background operations, such as internal I/O, internal scrubbing, error correction, background scanning, cache read, and/or the like. In certain embodiments, control of the background operation module 484 may be based on input from each of the host I/O profiler 431, the internal I/O profiler 433, and the drive state profiler 435.

By implementing such a data management scheme, the data management system 400 may be able to take advantage of the on-drive I/O information and further improve performance with respect to one or more aspects. In certain embodiments, implementation of the system 400 according to one or more embodiments disclosed herein may result in performance improvement of approximately 15-20% or more with respect to certain performance categories.

The operation of the I/O traffic profiler 437 and other components of the data management system 400 may advantageously provide desirable response time with respect to host I/O profile changes. As an example, when the host system (not shown) switches from a heavy random write I/O profile to a heavy, or full, random read I/O profile, the host I/O profiler 431 may detect the I/O profile transition. For example, the host I/O profiler 431 may detect a transition from a write-only profile to a no-write profile (e.g., for a relatively brief moment), and subsequently to a read-only profile; the profiler 431 may generate a succession of states, or state estimates, based on the detected transitions. The generated/determined states may be directly derived from the host path statistics 401, 403. At or around the same time, the drive state profiler 435 may determine that the data storage device is in a steady state, and provide such state information to the I/O traffic profiler 437. Based on the state information from the host I/O profiler 431 and the drive state profiler 435, the I/O traffic profiler 437 may instruct the garbage collection module 486 to shut-down garbage collection based on the estimate that the host is transitioning from the write-only profile to the read-only profile. For example, in response to such instructions, the garbage collection module 486 may turn off the internal write path. As a result, the host read performance may be at least partially improved.

I/O State Transitions

Figure 5:
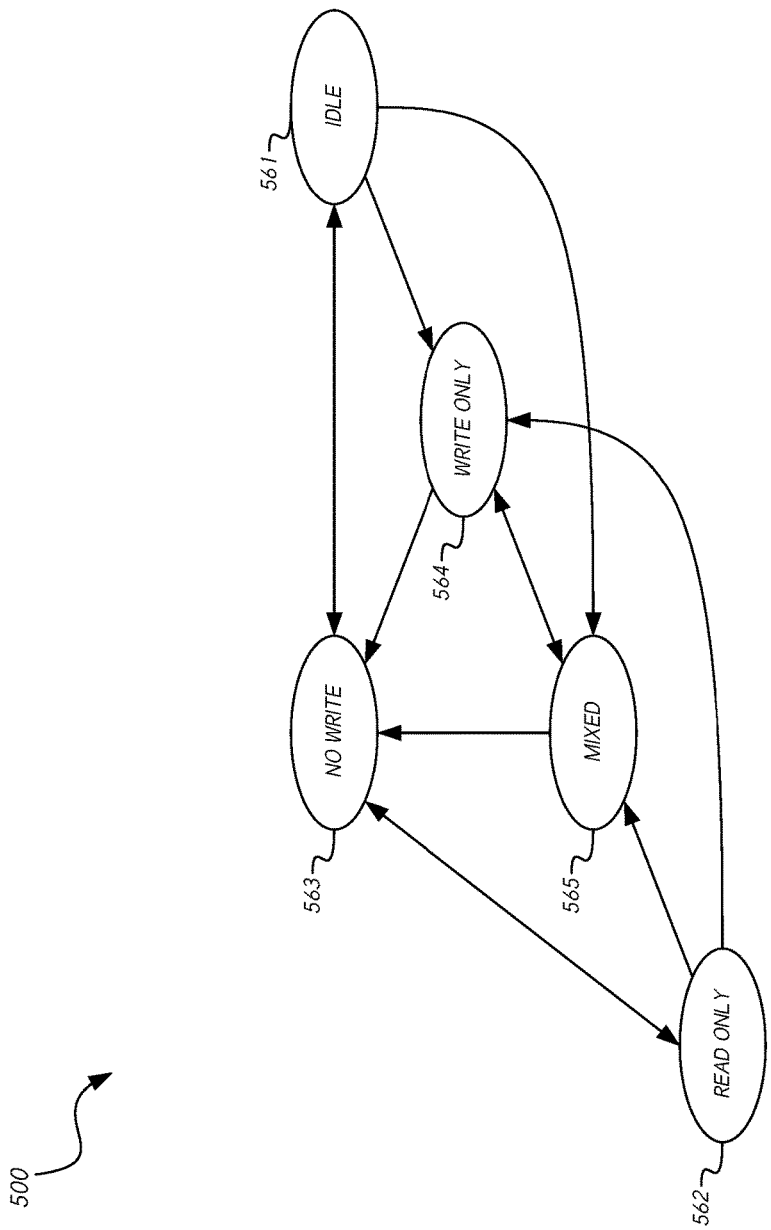
FIG. 5 is a state diagram showing state transitions representative of host I/O profiles according to one or more embodiments.

FIG. 5 is a state diagram 500 showing state transitions representative of host I/O profiles according to certain embodiments. For example, the state transition logic shown in FIG. 5 may be implemented by the host I/O profiler 431 of FIG. 4. The set of states shown in FIG. 5 includes a no write state 563 indicating that the host I/O does not include write operations. In certain embodiments, transition from the idle state 561 to the read-only state 562 may first require transitioning to the no-write state 563. In certain embodiments, the "no write" state may serve to establish a probation period while transitioning from an I/O profile that involves writes to a "ready only" or "idle" state. The use of the no write state 563 may help ensure that garbage collection, which may help to maintain the health of the solid-state storage device during periods in which write commands are being executed, is not turned off prematurely.

ADDITIONAL EMBODIMENTS

Those skilled in the art will appreciate that in some embodiments, other types of data storage systems and/or programming schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device comprising:
    a non-volatile memory array including a plurality of non-volatile memory cells;
    a host interface configured to receive data storage access commands from a host system;
    an input/output (I/O) traffic monitor configured to determine an I/O state of the data storage device based at least in part on the received data storage access commands by distinguishing between a transient state and a steady state;
    a host I/O profiler configured to determine a host I/O state based at least in part on the received data storage access commands by distinguishing among read, write, and idle host I/O states; and
    a data management controller configured to execute a data management operation based at least in part on the I/O state of the data storage device and on the host I/O state.

2. The data storage device of claim 1:
    wherein the host I/O profiler is further configured to determine host read statistics and host write statistics based on the received data storage commands; and
    wherein the I/O traffic monitor is further configured to determine the I/O state of the data storage device based at least in part on the host read statistics and the host write statistics.

3. The data storage device of claim 1, wherein the data management operation is related to spatial locality control, garbage collection, or wear leveling.

4. The data storage device of claim 1, wherein the data management controller is further configured to generate one or more data management control signals based at least in part on the I/O state of the data storage device and on the host I/O state.

5. The data storage device of claim 1, wherein the read, write, and idle host I/O states comprise an idle state, a read-only state, a no-write state, a write-only state, and a mixed read and write state.

6. The data storage device of claim 4, further comprising:
    an internal I/O profiler configured to determine internal I/O statistics; and
    wherein the I/O traffic monitor is further configured to determine the I/O state of the data storage device is based at least in part on the internal I/O statistics.

7. The data storage device of claim 6, wherein:
    the internal I/O profiler is further configured to determine an internal I/O state based at least in part on the internal I/O statistics; and
    wherein the data management controller is further configured to generate the one or more data management control signals based at least in part on the internal I/O state.

8. The data storage device of claim 7, wherein the internal I/O state comprises one or more of an idle state, a light internal I/O state, a moderate internal I/O state, and a heavy internal I/O state.

9. The data storage device of claim 1, wherein the transient state is a ramp-up state.

10. A method of managing input/output (I/O) traffic in a data storage device, the method comprising:
    receiving data storage access commands from a host system over a host interface of a data storage device;
    determining a host I/O state based at least in part on the received data storage access commands by distinguishing among read, write, and idle host I/O states;
    determining an I/O state of the data storage device based at least in part on the received data storage access commands, wherein determining the I/O state includes distinguishing between a transient state and a steady state; and
    executing a data management operation based at least in part on the I/O state of the data storage device and on the host I/O state.

11. The method of claim 10, wherein said determining the I/O state of the data storage device is based at least in part on the determined host I/O state.

12. The method of claim 10, wherein the transient state is a ramp-up state.

13. The method of claim 10, further comprising an internal I/O state associated with the data storage device, wherein said determining the I/O state of the data storage device is based at least in part on the determined internal I/O state.

14. The method of claim 13, wherein said determining the internal I/O state is based at least in part on internal write statistics associated with the data storage device.

15. The method of claim 10, further comprising determining a drive state associated with the data storage device, wherein said determining the I/O state of the data storage device is based at least in part on the determined drive state.

16. The method of claim 15, wherein said determining the drive state is based at least in part on host read statistics, host write statistics, and internal write statistics associated with the data storage device.

17. The method of claim 10, further comprising generating one or more data management control signals based at least in part on the I/O state of the data storage device.

18. The method of claim 17, wherein the data management operation is related to spatial locality control, garbage collection, or wear leveling.

19. The method of claim 10, wherein said determining the I/O state of the data storage device is based on the host I/O state and an internal I/O state of the data storage device.

20. A data storage device comprising:
- a non-volatile memory array including a plurality of non-volatile memory cells;
- a host interface configured to receive data storage access commands from a host system; means for determining host I/O activity associated with the data storage device;
- means for determining an input/output (I/O) state of the data storage device by distinguishing between a transient state and a steady state, the determination based at least in part on the host I/O activity associated with the data storage device;
- means for determining a host I/O state based at least in part on the received data storage access commands by distinguishing among read, write, and idle host I/O states; and
- means for executing a data management operation in the data storage device based at least in part on the I/O state of the data storage device and on the host I/O state.

21. The data storage device of claim 20, wherein the read, write, and idle host I/O states comprise an idle state, a read-only state, a no-write state, a write-only state, and a mixed read and write state.

22. The data storage device of claim 21, wherein the I/O state is based at least in part on the host I/O state.

23. The data storage device of claim 20, further comprising means for determining an internal I/O state associated with the data storage device.

24. The data storage device of claim 5, wherein a transition from the idle state to the read-only state requires first transitioning to the no-write state.

25. The method claim 10, wherein the read, write, and idle host I/O states comprise an idle state, a read-only state, a no-write state, a write-only state, and a mixed read and write state.

26. The method of claim 25, wherein a transition from the idle state to the read-only state requires first transitioning to the no-write state.

* * * * *